Aug. 25, 1936.  I. J. NOVAK  2,051,888

FRICTION MATERIAL AND PROCESS OF MANUFACTURING SAME

Filed Nov. 22, 1930

Witness:
Stephen V. Kelson

Inventor:
By Izador J. Novak
Frank L. Belknap
Atty.

Patented Aug. 25, 1936

2,051,888

UNITED STATES PATENT OFFICE 2,051,888

FRICTION MATERIAL AND PROCESS OF MANUFACTURING SAME

Izador J. Novak, Bridgeport, Conn., assignor to Raybestos-Manhattan, Inc., Bridgeport, Conn., a corporation of Connecticut Application November 22, 1930, Serial No. 497,429

3 Claims. (Cl. 91—70)

This invention relates to the art of making friction material, and refers more particularly to improvements in the manufacture of friction material such as brake linings and clutch facings for motor vehicles and other automotive devices.

In one specific embodiment of the invention, it relates particularly to an improved method of hardening an oxidizable binder in the fibrous base as a step in the manufacture of such friction material. The utilization of the present invention results in more uniform hardening of the binder in the thicknesses to which friction material is now limited, and in addition, permits of the manufacture of friction material of much greater thicknesses than those to which the industry is now limited because of impossibility of uniformly hardening the binder.

In previous practice, for instance, in making clutch facings or brake linings having an unwoven felted fibrous asbestos base, such a base is first prepared by forming a sheet of the asbestos on a suitable paper-making machine, drying the same, and cutting blanks of approximately the correct shape therefrom. These blanks are then saturated in a binder solution, for instance, linseed oil in gasoline or topped Mexican crude in gas oil, and the binder is then hardened by heating the saturated blank in an oxidizing atmosphere. However, due to the sealing effect which takes place on the surface of the blank which is obviously the first portion of the blank to harden, it is in most cases difficult, and, in some cases impossible, to harden the interior to even approximately the same degree as the surface.

For instance, with the asphaltic saturant mentioned above, the maximum thickness which can be hardened by oxidation even to approximately the same hardness in the interior as on the surface is a thickness of $\tfrac{3}{16}''$. With the drying oil binder, the maximum is about the same even though the latter binder hardens much more quickly than the former. Inasmuch as friction elements for heavy duty are frequently specified in greater thicknesses than this and the qualities of the above oxidizable binders make them particularly desirable, there has been a distinct need for friction elements of greater thicknesses.

The difficulty with thick friction elements made by the same procedure as thinner ones has been that, while the surface has been thoroughly hardened, the interior is still soft and weak and such elements when put into use show marked disintegration after the surface plies have been worn through.

Teeth are cut on the periphery of some clutch facings enabling them to be used as gears, and if the interior is still relatively soft, it is evident that the teeth may collapse.

The method of the present invention permits of the manufacture of thick friction elements particularly and thick fibrous structures in general containing an oxidizable hardening binder substantially uniformly hardened throughout the fibrous structure by providing a means for the entrance of air to the interior and the escape of gaseous products of oxidation or distillation. Inasmuch as past experience has demonstrated that a depth of about $\tfrac{3}{32}''$ from an exposed surface is about the maximum depth which can be satisfactorily hardened, in order to harden a heavy section of a friction element, for example, provision is made according to the present invention to have every point within the element not further than $\tfrac{3}{32}''$ from a surface. This is accomplished by pressing the structure with needles, punches, or drills, or any other suitable means which will provide holes whereby all points within the structure are sufficiently near to a surface so that the contained binder may, during the hardening process, distill its more volatile components and be oxidized by the air which now has access to it.

The operation of providing these additional surfaces must take place at some period during the manufacture, so chosen that later operations will not close the apertures thus provided. Thus, for example, if holes were provided in the original blank and saturation with a liquid binder was the next step, the holes might be partially filled with free saturant by capillary attraction and would, therefore, seal themselves so as to be of no value. The most satisfactory time for piercing in this case would be after a partial cure when most of the solvent had been eliminated, after which further curing could take place without any possibility of the holes filling up with saturant. Generally, the cure is divided into two steps, a preliminary cure or partial hardening followed by a final cure after the apertures are formed.

These apertures may be formed by drilling both surfaces of the fibrous base to a depth sufficient for the purpose, or the apertures may extend through the thickness of the base.

The apertures should be so spaced and of such size as to provide sufficient surface for oxidation and elimination of vapors without weakening the structure to the extent that the final product might be unfit for use for the purpose desired. For instance, the area of each aperture is much smaller than the thickness of the structure. For example, in one embodiment of the invention, a fibrous blank having a thickness of one-half inch is pierced on each side for two-thirds of its thickness with needles 1" in diameter and spaced about one-quarter inch apart. The apertures may be slightly larger or slightly smaller and may be spaced further apart or closer apart as conditions require.

For the purpose of a clear understanding of the invention reference is made to the accompanying drawing, wherein Fig. 1 is a top plan view of a relatively thick friction clutch facing, and Fig. 2 is a cross-sectional view taken on line 2—2 of Fig. 1.

Figure 1:
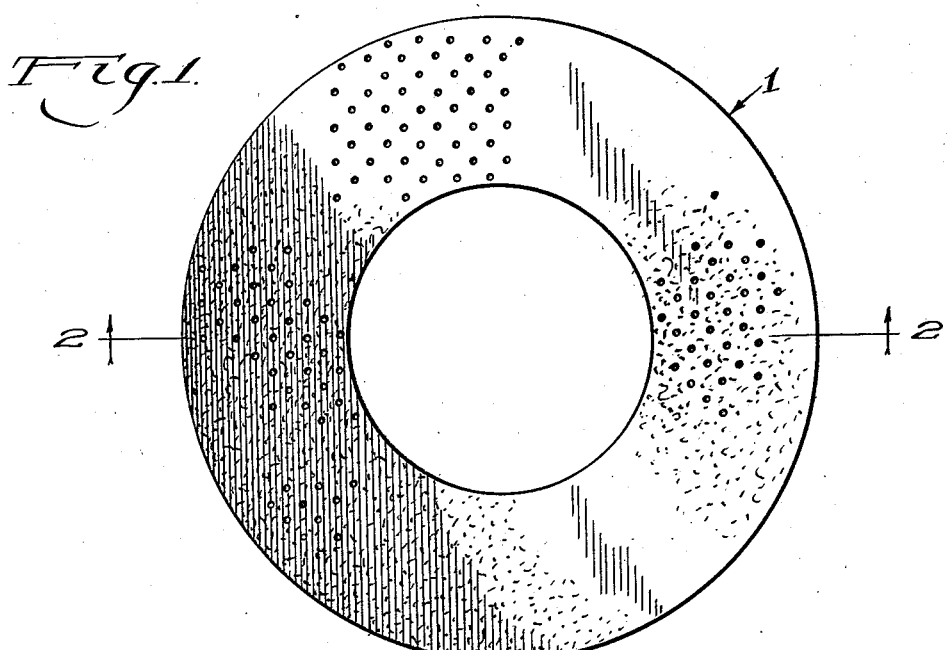
Figure 2:
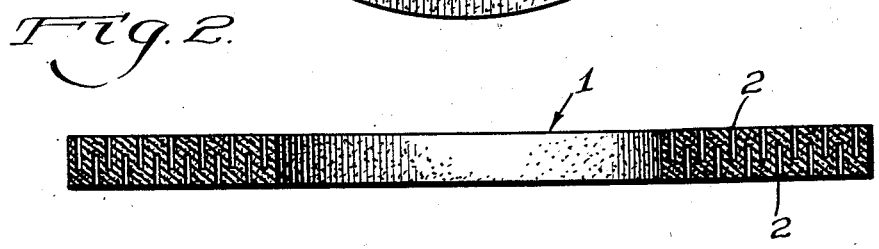

Referring more in detail to the drawing, I designates, as a whole, a friction clutch ring adapted for use in the clutches of motor vehicles and similar automotive devices. For the purpose of illustrating the invention, I have illustrated a relatively thick clutch facing approximately twice as thick as those to which the industry is now limited because of the impossibility of uniformly hardening the binder throughout the thickness. At some stage during the process of manufacturing element I, preferably between the initial partial cure and the final cure, the element is provided with apertures 2. These apertures may be formed by drilling the element inwardly from both surfaces, or may be formed in any other suitable way. The area of the apertures and the spacing between each aperture is such that all points within the element are sufficiently near to a surface having access to the atmosphere that the contained binder is uniformly hardened throughout the thickness of the element. By reference to Fig. 2 it will be seen that these apertures may be staggered and may project beyond the center of the structure.

Figure 3:
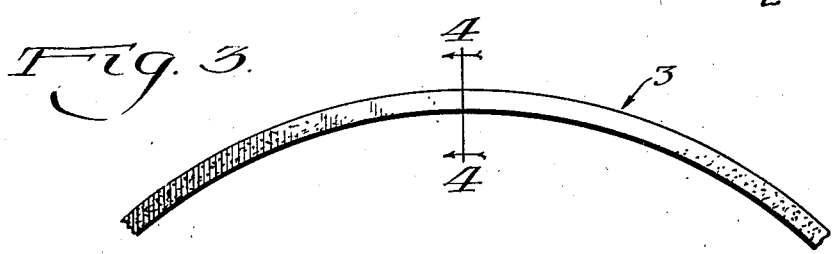
Fig. 3 is a fragmentary edge view of a conventional brake segment having an unwoven fibrous asbestos base.
Figure 4:
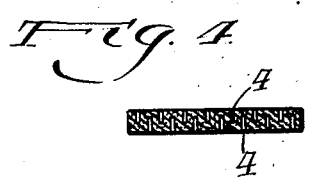
Fig. 4 is a transverse sectional view taken on line 4—4 of Fig. 3.

In Fig. 3 I have illustrated a conventional brake segment made of unwoven fibrous material. During the hardening of the binder the brake segment 3 is held to a predetermined curvature whereby the cured product takes the form illustrated in Fig. 3. The brake segment 3 may likewise be provided with holes 4 made by piercing both surfaces inwardly preferably beyond the center line so that the apertures while staggered, overlap in a transverse section.

Figure 5:
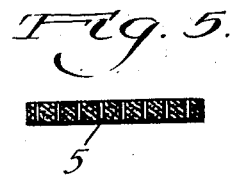
Fig. 5 is a transverse sectional view similar to Fig. 4 illustrating the apertures extending throughout the thickness of the fibrous base.

In Fig. 5 I have illustrated the apertures as extending throughout the thickness of the structure.

In general this method of providing access to free surfaces in elements in which it is desired to harden a binder may be used whenever difficulty has been encountered previously in uniformly curing the binder.

I claim as my invention:

1. In the manufacture of friction elements wherein an asbestos fibrous base is saturated with an oxidizable binder, the improvement which comprises providing the saturated structure with apertures of sufficient depth to permit access of air to the interior of the structure and escape of volatiles from said interior.

2. In the manufacture of friction elements wherein an asbestos fibrous base is saturated with an oxidizable binder and cured in an oxidizing atmosphere, the improvement which comprises providing the fibrous base, intermediate the saturation and the final cure, with apertures of sufficient depth to permit volatiles to escape from the interior of the fibrous base and to permit access of air to said interior.

3. In the manufacture of friction elements wherein a fibrous base is saturated with an oxidizable binder and partially cured, the improvement which comprises piercing said base to provide holes therein for the entrance of air to the interior and the escape of gaseous products of oxidation or distillation from the interior, and thereafter hardening the binder uniformly throughout the fibrous base by heat in an oxidizing atmosphere.

IZADOR J. NOVAK.